United States Patent
Slimani et al.

(10) Patent No.: US 9,631,764 B2
(45) Date of Patent: Apr. 25, 2017

(54) DEVICE AND METHOD FOR REPAIRING AN ELONGATE BODY

(71) Applicants: 3X ENGINEERING, Monaco (MC); TOTAL SA, Courbevoie (FR)

(72) Inventors: Hacen Slimani, Nice (FR); Stanislas Boulet D'Auria, Villefranche sur Mer (FR); Paul Wiet, Le Chesnay (FR)

(73) Assignees: 3X ENGINEERING, Monaco (MC); TOTAL SA, Courbevoie (FR)

( * ) Notice: Subject to any disclaimer, the term of this patent is extended or adjusted under 35 U.S.C. 154(b) by 32 days.

(21) Appl. No.: 14/406,004

(22) PCT Filed: Jun. 10, 2013

(86) PCT No.: PCT/FR2013/051341
§ 371 (c)(1),
(2) Date: Dec. 5, 2014

(87) PCT Pub. No.: WO2013/182831
PCT Pub. Date: Dec. 12, 2013

(65) Prior Publication Data
US 2015/0127194 A1 May 7, 2015

(30) Foreign Application Priority Data
Jun. 8, 2012 (FR) ...................... 12 55376

(51) Int. Cl.
*F16L 55/168* (2006.01)
*F16L 55/18* (2006.01)
(Continued)

(52) U.S. Cl.
CPC ............ *F16L 55/18* (2013.01); *B29C 63/10* (2013.01); *F16L 55/1686* (2013.01);
(Continued)

(58) Field of Classification Search
CPC .................................................. F16L 55/1686
See application file for complete search history.

(56) References Cited

U.S. PATENT DOCUMENTS 3,623,928 A * 11/1971 Wincklhofer et al. ..... C08J 9/24
138/129
3,775,219 A * 11/1973 Karlson ................ B29C 70/388
156/353
(Continued)

FOREIGN PATENT DOCUMENTS

EP 1016514 A2 7/2000
FR 2666864 A1 3/1992
(Continued)

*Primary Examiner* — Frederick L Lagman
(74) *Attorney, Agent, or Firm* — Pearne & Gordon LLP (57) ABSTRACT

A device (110) and a method for locally repairing or reinforcing an elongate body (100), said device (110) being intended for winding one or a plurality of layers of pre-impregnated polymerizable strip around the elongate body (100), said device (110) comprising: —releasable means (112, 113) of attachment around the elongate body (100), —means for the rotational movement of support structure (125) around the means (112, 113) of attachment, —means for the longitudinal movement of a spool (135) of a pre-impregnated polymerizable strip relative to the support structure (125), said support (125) comprising means for limiting the movement of the spool to a predetermined path, said spool (135) being unwindable when it is subjected to a given tension, —means for bringing the spool (135) into rotational and translational movement around the elongate body (100), causing the pre-impregnated polymerizable strip to be wound around said body.

20 Claims, 6 Drawing Sheets

(51) Int. Cl.
*B29C 63/10* (2006.01)
*B29C 65/00* (2006.01)
*B29C 65/02* (2006.01)
*B29C 65/14* (2006.01)

(52) U.S. Cl.
CPC .......... *B29C 65/02* (2013.01); *B29C 65/1406* (2013.01); *B29C 66/1122* (2013.01); *B29C 66/4329* (2013.01); *B29C 66/522* (2013.01); *B29C 66/5326* (2013.01); *B29C 66/652* (2013.01); *B29C 66/721* (2013.01); *B29C 66/73751* (2013.01); *B29C 66/8362* (2013.01); *Y10T 29/49732* (2015.01)

(56) References Cited

U.S. PATENT DOCUMENTS

| | | | | |
|---|---|---|---|---|
| 4,012,272 A | * | 3/1977 | Tiner | B29C 53/785 156/122 |
| 4,058,427 A | * | 11/1977 | Wilson | B29C 63/105 156/392 |
| 4,061,513 A | * | 12/1977 | Danielson | B29C 63/14 156/392 |
| 5,491,880 A | * | 2/1996 | Labiche | B29C 63/10 156/282 |
| 6,276,401 B1 | * | 8/2001 | Wilson | F16L 58/1063 138/172 |
| 6,405,671 B1 | | 6/2002 | Worth | |
| 6,620,471 B1 | * | 9/2003 | Do | F16L 58/16 428/292.1 |
| 2011/0079310 A1 | * | 4/2011 | Thompson | B29C 63/105 138/99 |
| 2012/0255641 A1 | * | 10/2012 | Venero | B29C 63/105 138/97 |
| 2013/0312862 A1 | * | 11/2013 | Kalman | B32B 1/08 138/125 |

FOREIGN PATENT DOCUMENTS

WO  WO 2012013847 A1 * 2/2012 ............... F16L 1/26
WO  WO 2015181374     * 12/2015

* cited by examiner

DEVICE AND METHOD FOR REPAIRING AN ELONGATE BODY

This application is a National Stage application of PCT international application PCT/FR2013/051341, filed on Jun. 10, 2013 which claims the priority of French Patent Application No. 12 55376 entitled "DEVICE AND METHOD FOR REPAIRING AN ELONGATE BODY", filed with the French Patent Office on Jun. 8, 2012, both of which are incorporated herein by reference in their entirety.

FIELD OF THE INVENTION

This invention concerns a device for repairing an elongate body and a method for repairing such a body. More specifically, this invention concerns the repair or local reinforcement of transport lines for water, gas, oil, or other fluids.

PRIOR ART

Underwater or onshore lines for transporting fluids (such as aqueducts for water, pipelines for oil) or gas are subject to thermal, physical, or chemical stresses that cause damages. It is costly to repair the damages. These lines generally have a substantially circular cross-section.

The repair of such a line may be carried out by various methods, such as soldering or affixing a cuff, and/or the total replacement of a segment. The main disadvantage of replacing a section of pipe is that it is inconvenient to carry out, because it necessitates stopping the flow of the internal effluent, e.g., liquid, gas, or other mixtures, in the section of pipe to be repaired. External rehabilitation techniques for pipelines allow the replacement of a section of pipe to be avoided.

Document FR 1004758, by the same inventor, concerns a device for repairing a pipe, comprising an elastomeric plate applied to the leak by a force distributor and strapped around it, thus allowing for blockage of the hole or fissure.

Also known is document FR 2 666 864, describing a system for unwinding a strip consisting of fibres dipped in a thermoplastic. Such a strip does not allow for a tight seal due to very plasticity of its material. Additionally, in the underwater setting, the heating of the strip is particularly delicate and irregular. The resultant non-homogeneity of the elasticity increases the fragility of the repair. The elasticity of the thermoplastic strip limits the use of this system for repairing pipes under pressure. Lastly, this document describes assembling successive coils that are in contact with one another, resulting in a poor seal at their margins.

DESCRIPTION OF THE INVENTION

One objective of the invention is to provide a device for repairing or locally reinforcing an elongate body that is reliable, rapid, easily implemented, and allows for winding a pre-impregnated polymerisable strip around the area to be repaired.

Another objective of the invention is to provide a device for repairing or locally reinforcing an elongate body that is capable of adapting to different diameters and shapes of the elongate body.

To this end, in a first aspect, this invention concerns a device for repairing or locally reinforcing an elongate body which has a modified integrity, in which in one or more layers of a pre-impregnated polymerisable band are wound around the elongate body, including:

means of movable fixation around the elongate body,
means of rotary movement of a support structure around the fixation means,
means of longitudinal movement of a spool of pre-impregnated polymerisable strip relative to the support structure, whereby the support includes means of limiting the movement of the spool to a predetermined course, and whereby the spool can be unwound when subjected to a specified tension, and
means of causing rotary and translative movement of the spool around the elongate body, resulting in the winding of the pre-impregnated strip around the body.

In other words, the device is affixed by the fixation means to the external surface of the elongate body at the level of the area to be repaired or reinforced.

'Elongate body' refers here to an object that is substantially greater in length than in width, such as pipelines for transporting a fluid, but also pillars. The elongate body may have, e.g., a symmetrical or asymmetrical, cylindrical, round, or square cross-section.

Below, a longitudinal axis X is defined that is parallel to the principal local axis of the elongate body to be repaired.

A spool of pre-impregnated polymerisable strip is connected to a support attached to the device. The support is configured for rotary movement around the fixation means, and thus around the elongate body. It also causes the spool to wind the pre-impregnated polymerisable strip around the area of the surface to be repaired or reinforced. The spool is connected to the support by a connection that allows it to move longitudinally in both directions according to a predetermined direction, preferably in a direction parallel to the axis x. The amplitude of this movement is determined by support means, e.g., by the length of the support.

The device functions as follows. Once the device is installed on the elongate body at the level of the area to be repaired, the spool is actuated so as to rotate about the surface in order to wind the pre-impregnated polymerisable strip around the area to be repaired or reinforced. The rotary movement is accompanied by a translative movement parallel to a longitudinal axis, predetermined in a first direction, of the elongate body. Once the first layer of the pre-impregnated polymerisable band has been wound, the spool is actuated so as to rotate and translate in the opposite direction, allowing a second layer to be wound evenly and at a regular winding rate, on top of the first layer. Several layers of the pre-impregnated polymerisable strip are thus wound on the area to be repaired or reinforced. The device allows the strip to be wound evenly, i.e., at a regular pressure and speed, thus allowing the mechanical integrity of the affected area to be restored.

It should be noted that the device is simple to execute, and can easily be transported to the site and easily actuated by an operator. Alternatively, the device may operated by an automaton, in particular a remotely operated automaton that ensures that the reinforcement or repair process can be repeated.

The invention may be executed according to the advantageous embodiments described below, which may be taken individually or in any feasible combination.

The device is suitable for repair or local reinforcement of overland or underwater pipelines transporting fluids or gases, e.g., oil pipelines.

Because the spool is removable, it may be replaced by another spool as often as necessary to repair the affected area.

In some embodiments, the means of affixing the device to the elongate body comprise at least two clamps to be affixed around the elongate body.

'Clamp' refers to a piece suited to be affixed to a second part on the elongate body.

The two clamps of the fixation means are configured so as to be affixed to elongate bodies having diameters between two predetermined values. Thus, the device may advantageously be adapted to elongate bodies of various types.

In some embodiments, the device according to the invention includes at least two half-feeders to be affixed around the elongate body.

In some embodiments, the longitudinal support is a beam having a rigidity greater than a predetermined value, comprising longitudinal bars configured to support a spool, the beam being affixed the fixation means of the device on one of its ends and being configured for rotational movement around the longitudinal axis of the elongate body.

Advantageously, the beam allows for a high degree of stability of the device, in particular when the spool is in motion.

Preferably, the support comprises a system of pinions allowing for rotational movement of the support around the fixation means and the elongate body.

In some embodiments, the longitudinal support is a truss triangulated by a diagonal bar. Advantageously, the diagonal bar allows for further increases in the rigidity of the bar and thus the stability of the support.

In some embodiments, the device according to the invention further includes means for positioning the spool according to a predetermined orientation relative to the surface of the elongate body.

In some embodiments, the device according to this invention further includes means for positioning the spool at a predetermined distance from the surface of the elongate body.

By way of non-limitative example, the means for positioning the spool may be support bars. Preferably, the spool is affixed to at least two parallel support bars that are part of the support, and is connected with a carriage comprising wheels for tensioning the strip and/or applying the strip to the elongate body at a constant predetermined pressure, for any number of winding steps.

Thus, the device according to the invention allows the pre-impregnated polymerisable strip to be wound at even and/or specifiable tension and winding speed.

When successive layers of the pre-impregnated polymerisable strip are wound, the increase in diameter must be taken into account. The advantage of the device according to the invention is that it allows the strip to be wound at constant tension and speed. Additionally, the speed and tension of the strip, which are adjusted as the winding progresses, allows for durable, permanent repairs. In preferred embodiments, the winding may be interrupted at any time by the operator.

According to some embodiments, the spool is affixed to at least two parallel support bars that are part of the support, and is connected with a carriage comprising wheels for tensioning the strip at a constant pressure, for any number of winding steps.

According to some embodiments, the spool is affixed to at least two parallel support bars that are part of the support, and is connected with a carriage comprising wheels for applying the strip to the elongate body at a constant pressure, for any number of winding steps.

In some embodiments, the device according to the invention further includes means for automatic rotary movement of the spool.

In some embodiments, the device according to the invention further includes means for automatic longitudinal translative movement of the spool in both directions in a longitudinal direction of the elongate body.

These means allow for automatic movement, and may be, e.g., a system of gears and threaded push-rods of the type known to persons skilled in the art.

In some embodiments, the device according to the invention further includes a counter of the number of times the support has moved around the elongate body.

In some embodiments, the device according to this invention includes, on one end of the support structure, a roller abutting the elongate body.

In some embodiments, the device according to this invention includes, on one end of the support structure, a pad abutting the elongate body.

Due to each of the above, the support structure remains at a predetermined distance and parallel to the elongate body.

In some embodiments, the means of affixing the device to the elongate body comprises two parts, each consisting of two clamps configured to be affixed on either side of a damaged area of the pipe; the support comprises parallel longitudinal bars that are affixed on each of their ends to fixation rings and capable of rotational movement around the longitudinal body, whereby the spool of the pre-impregnated polymerisable strip is affixed to at least two of these bars and capable of translative movement in both directions.

In some embodiments, the means of affixing the device to the pipe comprise at least two chains configured to be affixed on either side of the damages area of the elongate body. Each of the chains is suited to move between the gears that are rotationally movable on the chain. A longitudinal bar having a predetermined length is connected at each end with the gears. A spool of pre-impregnated polymerisable strip is connected with the longitudinal support bar and configured for translative movement on the support in both directions.

According to a second aspect, this invention concerns a remotely operated underwater vehicle that includes a device according to this invention.

The device may, in particular, be actuated by hydraulic or electric motors acting directly or indirectly on the winding axes. The device may then be viewed remotely by camera and operated remotely to allow for semi-automatic repairs, thus obviating the need for human diving.

In some embodiments, the apparatus according to the invention further includes means for remote actuation of the device according to the invention.

In some embodiments, the apparatus according to the invention includes at least one camera and a device for remote transmission of the images captured by each camera.

According to a third aspect, this invention concerns a method for repairing an elongate body which has a modified integrity, or for locally reinforcing its surface, comprising the following steps:

affixing a device according to this invention to the elongate body by means of fixation means,
  actuating the device by causing the spool to move rotationally around the elongate body and translatively in a longitudinal direction of the elongate body, allowing successive layers of pre-impregnated polymerisable strips to be wound around a predetermined area of the elongate body,
  withdrawing the repair device, and
  polymerizing the pre-impregnated polymerisable strips.

In the step of actuating the device, the spool may be caused to move manually or automatically, e.g., by a system of pinions. Alternatively, it may be caused to move using hydraulic motors or any other device known to persons skilled in the art.

In some embodiments, the method according to the invention includes the replacement of the spool between two passes of a spool along and around the pipe to change the characteristics of the pre-impregnated polymerisable strip being wound between two consecutive layers.

In some embodiments, the method according to the invention includes a step of counting, by means of a counter, and storing the number of passes made by the spool around the area to be repaired or reinforced.

In some embodiments, an initial calibration allows for the reproduction of the desired tension of the pre-impregnated polymerisable strip during winding.

The advantages, objectives, and characteristics of this apparatus and method are similar to those of the repair device according to the invention, and will not be repeated here.

BRIEF DESCRIPTION OF THE DRAWINGS

Other advantages, objectives, and features of this invention will become apparent from the following description, provided for illustration and without limitation, by reference to the attached drawings.

DETAILED DESCRIPTION OF THE INVENTION

Figure 1:
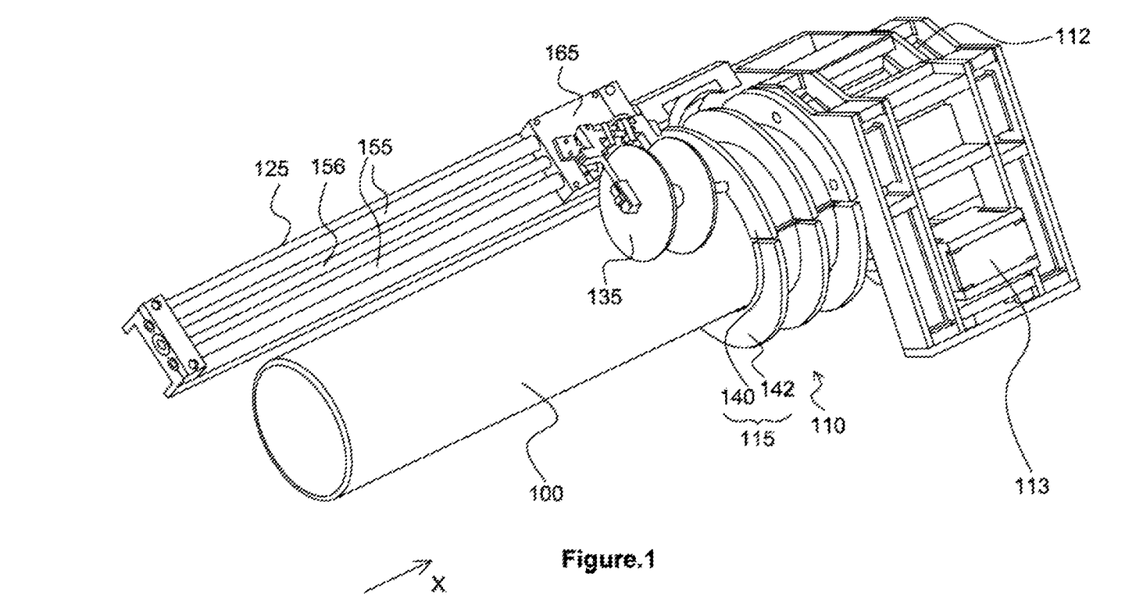
FIGS. 1 and 2 are schematic representations of a perspective view, after and before fixation onto a pipe, respectively, of a particular embodiment of the device according to the invention.
Figure 2:
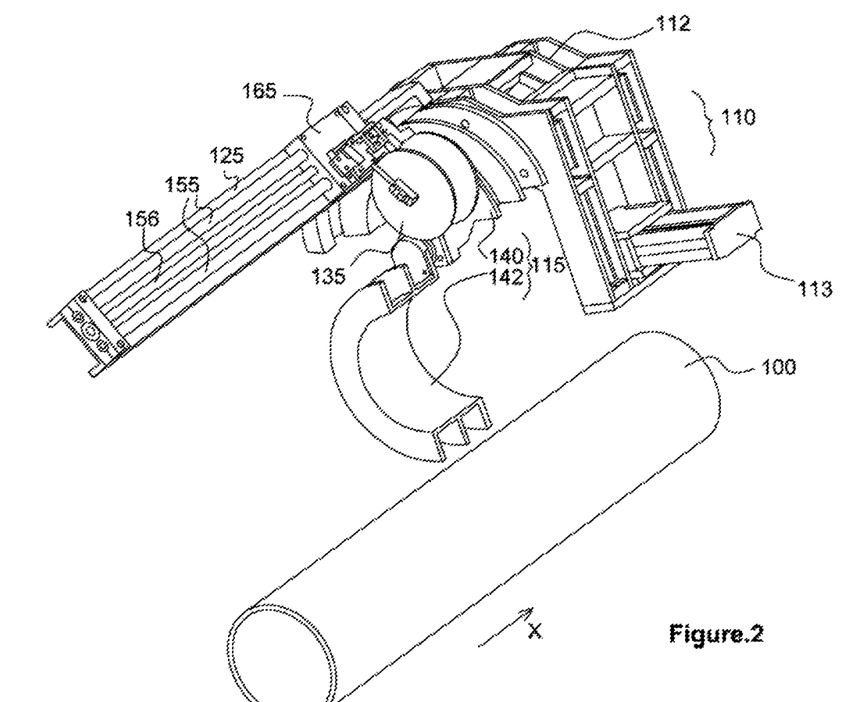

Referring to FIGS. 1 and 2, a particular embodiment of the repair or local reinforcement device according to the invention is described.

In this embodiment, the elongate body to be repaired or locally reinforced is an underwater pipeline transporting a fluid. However, the device 110 is suited for any type of pipe and other types of tubes, such as the masts of a ship or columns of pillars. A section of a tubular pipe 100 has an area of affected integrity, e.g., a fissure, dent, erosion, or internal or external corrosion.

The device 110 according to the invention allows for the repair or local reinforcement of a damaged area of the surface of a pipe 100 by winding around the area to be repaired one or more layers of a pre-impregnated strip.

The device 100 comprises:
a means of removable fixation on the pipe 100,
means of rotary movement of a support structure 125 around the fixation means and thus around the pipe 100,
means of longitudinal movement of a spool 135 of pre-impregnated polymerisable strip relative to the support structure 125, whereby the support includes means of limiting the movement of the spool to a predetermined course, and whereby the spool 135 can be unwound when subjected to a specified tension.

The device 110 allows for rotational and translative movement of the spool 135, which causes the pre-impregnated polymerisable strip to be wound around the pipe 100 at an even tension and a regulatable winding speed. The spool 135 is removable. It may be replaced by another spool on the support.

FIG. 1 shows a particular embodiment of the device 110. In this embodiment, the device 110 is removably affixed to the pipe 100 by a means of fixation. This fixation means comprises, in this embodiment, at least two clamps 112 and 113. The two clamps 112 and 113, in this non-limiting exemplary embodiment, are suited to be affixed to pipes of various diameters. To this end, as shown in FIG. 1, the clamp 112 is extended by a support along which the clamp 113 may be moved longitudinally depending on the diameter of the pipe 100, and, on the other hand, transversely, as can be seen in two extreme positions of this transverse movement in FIGS. 1 and 2.

The two clamps 112 and 113 are affixed around the pipe 100 and connected by means of fixation and/or adjustment means. For example, the movement of the clamps 112 and 113 is similar to that of a seal-tightening screw. The two clamps 112 and 113 are equipped with pads to protect the pipe 100 during sealing.

In this embodiment, the fixation means further includes an assembly 115 of at least two circular half-feeders.

In the embodiment shown in FIGS. 1 and 2, the assembly 115 includes four half-feeders 140 and 142 to be affixed around the elongate body 100, on the one hand to retain the device on the pipe 100 and, on the other hand, to guide the rotation of the support structure around the pipe 100. By forming two circular parallel feeders, as shown in FIGS. 1 and 2, the four half-feeders 140 and 142 improve the rigidity of the device.

A longitudinal support 125 is connected to the fixation means of the device. In this embodiment, the longitudinal support 125 is a truss triangulated by a diagonal bar and having a rigidity greater than a specified value.

Longitudinal bars 155 and 156 configured to support a spool 135 are affixed on the support beam 125. Furthermore, the beam 125 is affixed to the fixation means of the device 110 on one of its ends so as to allow the support 125 to move rotationally around the fixation means and thus around the pipe 100. This fixation is obtained, in one exemplary embodiment, by a caliper system. Furthermore, a system of pinions, cooperating with the locks of the feeders 140 and 142 of the fixation means, allows the rotation of the support 125 around the fixation means.

Preferably, the distance between two consecutive passes of the pre-impregnated polymerisable strip is less than the width of the pre-impregnated polymerisable strip.

The rotation of the support 125, whether manual or motorised, simultaneously causes the spool 135 to rotate in order to wind the pre-impregnated polymerisable strip around the area of the pipe 100.

The beam 125 allows for a high degree of stability of the device, in particular when the spool 135 is in motion. The diagonal bar further reinforces the rigidity of the device.

The spool 135 is connected to three substantially parallel bars 155 and 156 of the support 125 whilst remaining free to move in translation relative to these bars 155 and 156. These bars 155 and 156 allow for the spool 135 to be positioned stably according to an optimal orientation relative to the pipe 100, in particular according to a predetermine distance and angle relative to the surface of the pipe 100. Thus, the spool 135 is connected to the support 125 by connection that allows it to move longitudinally in both directions according to a predetermined direction. The amplitude of this movement is determined by support means, e.g., here by the length of the bars 155 and 156 of the support 125.

Furthermore, in one exemplary embodiment provided by way of example here, the spool is connected to a carriage 165 comprising wheels for tensioning the strip and/or applying the strip to the pipe 100 at a predetermined constant pressure for any number of winding passes that may be necessary.

Figure 6:
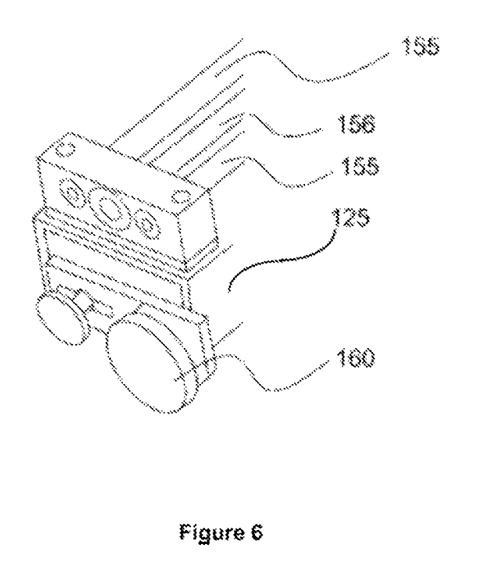
FIG. 6 is a schematic representation of a partial perspective view of a variant of the first embodiment of the device shown in FIGS. 1 and 2.

As shown in FIG. 6, in some embodiments, a castor 160 is added at the end of the beam 125. This roller 160 rests on the pipe 100 and allows for better stability of the support structure of the spool 135 during its rotation around the pipe 100. In some variants, a pad (not shown) having an anti-friction coating, e.g., teflon, replaces the roller 160 to carry out the same stabilising function, and avoids problems related to overheating of the roller 160.

In this exemplary embodiment, the device 110 further comprises means (not shown in the figures) to allow for the automatic rotational and/or longitudinal translative movement of the spool 135 in both directions, e.g., a system of pinions and threaded push-rods of the type known to persons skilled in the art.

Operation

The device 110 is first moved to the right of the area of the pipe to be repaired and affixed to the pipe 100. Once the device is installed on the pipe 100 at the level of the area to be repaired, the spool 135 is actuated so as to rotate about the pipe 100 in order to wind the pre-impregnated polymerisable strip around the area to be repaired. The rotary movement is accompanied by a translative movement along a longitudinal axis, predetermined in a first direction, of the pipe 100.

Once the first layer of the pre-impregnated polymerisable strip has been wound, the spool 135 is actuated to rotate and move laterally in the opposite direction. This allows even winding of a second layer on top of the first at a regular winding speed.

Several layers of the pre-impregnated polymerisable strip are thus wound on the area to be repaired or locally reinforced. The device 110 allows the strip to be wound evenly, i.e., at a regular tension and/or pressure and speed, thus allowing, e.g., the mechanical integrity of the affected area to be restored.

It should be noted that there are two concomitant phenomena. On the one hand, the initial tension of the strip, which is ensured by a device such as an unwinding brake of a tape carrying cartridge. On the other hand, the pressure of the strip, which allows for the resin and interstitial water to be spun, followed by proper application of one strip on another. This pressure is the result of the initial tension of the strip.

Figure 5:
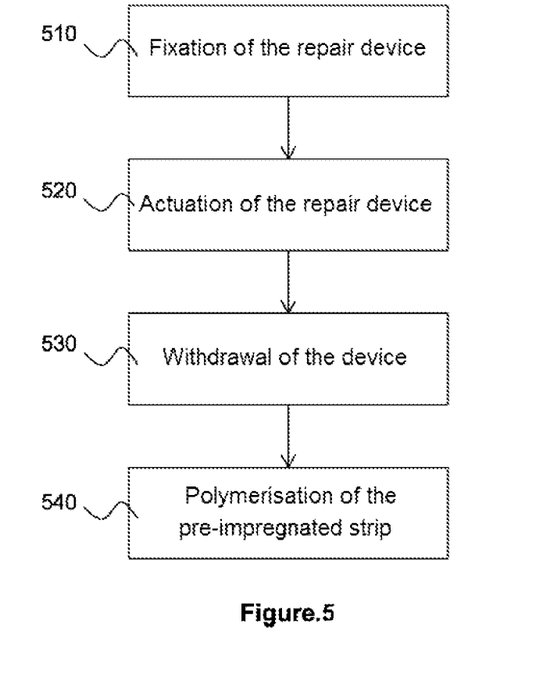
FIG. 5 shows the various steps of a method for repairing or locally reinforcing a pipe according to the invention in the form of a flowchart.

More specifically, the method for repairing or locally reinforcing an elongate body is shown schematically in the form of a flowchart in FIG. 5. In one exemplary embodiment of the method, the elongate body is a pipe for transporting a fluid.

The method for repairing or locally reinforcing the pipe comprises the following steps:
 affixing 510 a device 110 as described above to the pipe 100 by means of fixation means,
 actuating 520 the device 110 by causing the spool 135 to move rotationally around the pipe 100 and translatively in a longitudinal direction of the pipe 100, allowing successive layers of pre-impregnated polymerisable strips to be wound around a predetermined area of the pipe 100,
 withdrawing 530 the device 110, and
 polymerizing 540 the pre-impregnated polymerisable strips.

Thus, in a first step 510, an operator affixes the device 110 at the level of the area of the pipe 100 to repair by means of the fixation means 112 and 113. The device 110 is easy to transport to the site of the repair, and its weight is suited for manipulation by one or more operators or divers, in the case of an underwater pipe 100. It is also suited for manipulation by a remotely-controlled automaton.

Furthermore, the device can be adapted to pipes 100 of various diameters and variable sizes of the area to be repaired.

Then, in a second step 520, the device 110 is actuated manually or automatically by causing the spool 135, 440 to rotate around the fixation means 112 and 113 and thus the pipe 100. At the same time, the spool is moved laterally in a longitudinal direction in a first direction in order to wind a first layer of pre-impregnated polymerisable strip around the area to be repaired. The spool 135, 440 is retained on the support at a predetermined distance and angle relative to the pipe 100, allowing for winding at regular tension and speed. The translational pass of the spool 135, 440 is delimited in both directions by the support means. Once the first layer of the pre-impregnated polymerisable strip has been wound, the spool 135, 440 is actuated so as to translate in the opposite direction and also to rotate around the pipe 100, allowing a second layer of the pre-impregnated polymerisable strip to be wound evenly and at a regular winding rate, on top of the first layer. The layers of the strip are thus superimposed in an optimal fashion in terms of tension and at a regular speed. The operations require minimal effort on the part of the operators in order to obtain a quality repair. The actions are repeated to wind as many layers as necessary to allow for the repair of the damaged area or the local reinforcement of the pipe.

In particular embodiments of the method according to the invention, during step 520, between two passes of a spool 135, 440 along and around the pipe 100, the spool 135, 440 is replaced to change the characteristics, in particular the chemical or mechanical characteristics, of the pre-impregnated polymerisable strip being wound between two consecutive layers. For example, the consecutive strips may have different components (e.g., carbon fibres, glass fibres, or another component), different resins, different weaves, different fibre or thread orientations, different widths or thicknesses. Thus, layers of strips are superimposed that, once polymerised, combine their respective technical advantages, in particular in terms of rigidity, isotropy, flexibility, or sealing.

In a third step 530, the device 110 is withdrawn from the pipe 100, and, in a final step 540, the polymerisation of the pre-impregnated polymerisable strip is initiated by known means depending, in particular, on the type of pre-impregnated polymerisable strip used and the conditions of the repair. For example, this polymerisation may be initiated by ultraviolet radiation or the application of heat.

Advantages of the Invention

It will be understood that the device 110 is simple to implement. In fact, this device 110 is easy to transport to the site, and an operator or a remotely-controlled automaton may easily actuate it under water.

The device 110 is suitable, in particular, for repair or local reinforcement of on shore or underwater pipelines transporting fluids or gases, e.g., oil or gas pipelines.

In one application, the device according to this invention is integrated with or borne by an underwater vehicle (not shown). Preferably, this underwater vehicle and the device according to this invention are remotely controlled. To this end, the underwater vehicle according to the invention includes means of communication and remote actuation of the device. Preferably, the underwater vehicle at least one camera and a device for remote transmission of the images captured by each camera. Thus, a remote operator may view and control the placement of the device on the elongate body, and then the operation of the device.

Variants

Figure 3:
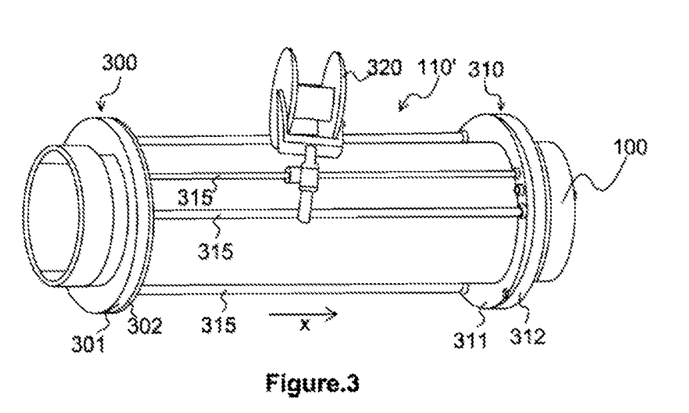
FIG. 3 is a schematic representation of a perspective view of a second particular embodiment of the device according to the invention.

FIG. 3 is a schematic representation of an alternative embodiment of the device 110' according to the invention.

In this embodiment, the means of affixing the device 110' to the pipe 100 comprises two assemblies 300 and 310 of two half-feeders consisting of a groove, respectively 301 and 312, surrounded by flanks, respectively 302 and 311, supporting guide bars 315 parallel to the axis of the pipe 100. A spool 320 is borne by a support structure mounted on at least one guide bar 315.

Figure 4:
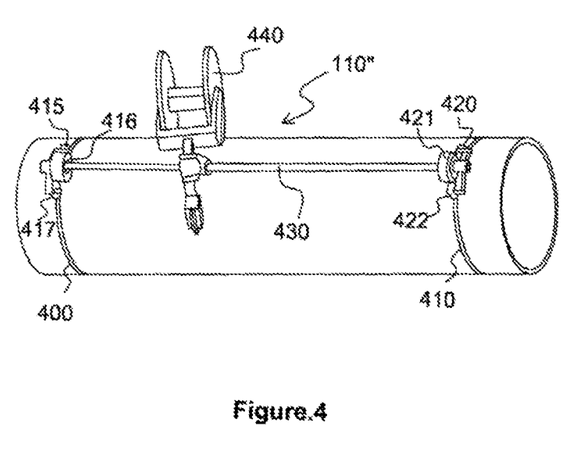
FIG. 4 is a schematic representation of a perspective view of a third embodiment of the device according to the invention.

FIG. 4 is a schematic representation of an alternative embodiment of the device 110" according to the invention.

In this embodiment, the means of affixing the device 110" to the pipe 100 comprise at least two chains 400, 410 configured to be affixed on either side of the damages area of the pipe 100. Each of the chains 400, 410 moves between gears 415, 416, 417, 420, 421, 422 that are rotationally movable on the chain 400, 410. In this embodiment each chain 400, 410 moves between three gears 415, 416, 417, and 420, 421, 422, respectively.

The gears 416 and 421 are thus caused to rotate on themselves during the rotation of the bar 430, which forms their common axis around the pipe 100.

The support consists of a longitudinal bar 430 having a predetermined length, which is connected at each end with the gears 415, 416, 417, 420, 421, 422.

A spool 440 of pre-impregnated strip is affixed to the support bar 430. This spool 440 is configured to move laterally on the support bar 430 in both directions.

The invention claimed is:

1. Device for repairing or locally reinforcing an elongate body which has a modified integrity, to wind one or more layers of a pre-impregnated polymerizable band around the elongate body, the device comprising:
   a fixation apparatus for removable fixation around the elongate body,
   a spool of pre-impregnated polymerizable strip, and
   a mechanism for causing rotary and translative movement of the spool around the elongate body, resulting in the winding of the pre-impregnated strip around the body, the mechanism comprising:
   a support structure;
   an assembly for rotary movement of the support structure around the fixation apparatus, and
   an assembly for longitudinal movement of the spool of pre-impregnated polymerizable strip relative to the support structure, whereby the support includes an apparatus for limiting the movement of the spool to a predetermined course, and whereby the spool can be unwound when subjected to a specified tension.

2. Device according to claim 1, whereby the fixation apparatus comprises at least two clamps to be affixed around the elongate body.

3. Device according to claim 1, comprising at least two half-feeders to be affixed around the elongate body.

4. Device according to claim 1, whereby the support structure is a beam having a rigidity greater than a predetermined value, comprising longitudinal bars configured to support a spool, the beam being affixed to the fixation apparatus of the device on one of its ends and being configured for rotational movement around the longitudinal axis of the elongate body.

5. Device according to claim 1, further including a first positioning apparatus for positioning the spool according to a predetermined orientation relative to the surface of the elongate body.

6. Device according to claim 1, further including a second positioning apparatus for positioning the spool at a predetermined distance from the surface of the elongate body.

7. Device according to claim 1, whereby the spool is affixed to at least two parallel support bars that are part of the support, and is connected with a carriage comprising wheels for tensioning the strip at a constant pressure, for any number of winding steps.

8. Device according to claim 1, whereby the spool is affixed to at least two parallel support bars that are part of the support, and is connected with a carriage comprising wheels for applying the strip to the elongate body at a constant pressure, for any number of winding steps.

9. Device according to claim 1, further including an apparatus for automatic rotary movement of the spool.

10. Device according to claim 1, further including an apparatus for automatic longitudinal movement of the spool in both directions according to a longitudinal direction of the elongate body.

11. Device according to claim 1, further including a counter of the number of times the support has moved around the elongate body.

12. Device according to claim 1, further including, at one end of the support structure, a roller abutting the elongate body.

13. Device according to claim 1, including, at one end of the support structure, a pad bearing on the elongate body.

14. A kit comprising:
   a remotely-operated underwater vehicle;
   a device according to claim 1 carried by the remotely operated underwater vehicle; and
   a polymerization initiating device able to initiate an underwater polymerization of the pre-impregnated polymerizable strip.

15. Underwater vehicle according to claim 14, further including an apparatus for remote actuation of the device according to claim 1.

16. Underwater vehicle according to claim 14, including at least one camera and a device for remote transmission of the images captured by each camera.

17. Method for repairing an elongate body which has a modified integrity, or for locally reinforcing its surface, comprising the following steps:
   affixing a device according to claim 1 to the elongate body by means of a fixation apparatus,
   actuating the device by causing the spool to move rotationally around the elongate body and in translation in a longitudinal direction of the elongate body, allowing successive layers of pre-impregnated polymerizable strips to be wound around a predetermined area of the elongate body, withdrawing the repair device, and polymerizing the pre-impregnated polymerizable strips.

18. Method according to claim 17, including, during the actuating step, the replacement of the spool between two passes of a spool along and around the pipe to change the characteristics of the pre-impregnated polymerizable strip being wound between two consecutive layers.

19. Method according to claim 17, wherein said step of polymerizing is initiated by ultraviolet radiation or applying heat.

20. The method according to claim 17, wherein the steps are carried out underwater.

* * * * *